Jan. 22, 1963  B. R. SMITH  3,074,143
METHOD OF MAKING METALIZED CERAMIC BODIES
Filed Feb. 1, 1960
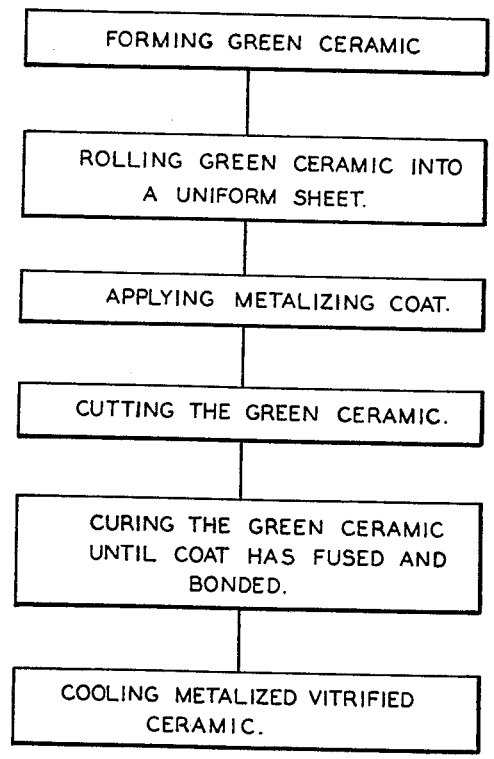
INVENTOR
BAYNARD R. SMITH
BY Norman N. Popper
ATTORNEY

United States Patent Office 3,074,143
Patented Jan. 22, 1963

3,074,143
METHOD OF MAKING METALIZED
CERAMIC BODIES
Baynard R. Smith, 300 Main St., Matawan, N.J.
Filed Feb. 1, 1960, Ser. No. 5,627
2 Claims. (Cl. 25—156)

My invention relates to a method of making metalized ceramic bodies and particularly to the mass production of metalized ceramic bodies.

It is an object of my invention to effect great economies in the production of metalized ceramic bodies.

It is a further object of my invention to provide a method of making metalized ceramic bodies by punching or cutting a metalized green ceramic strip which is in a plastic state.

It is yet a further object of my invention to provide a method of producing metalized ceramic bodies in innumerable shapes, irregular in form, perforate or imperforate.

Yet a further object of my invention is to provide a method of making metalized ceramic bodies in a single first step for metalizing a plastic green ceramic body, and a second step for firing the green ceramic and bonding the previously applied metal coat at the same time that the ceramic body is fired.

These objects and advantages as well as other objects and advantages may be achieved by the method hereinafter referred to.

This application is a continuation in part of my co-pending application filed January 22, 1960, Serial Number 4,603, now abandoned.

Increasing use of metalized ceramic bodies is occurring in the electronics industry and other arts. Ceramic bodies in numerous shapes both simple and complex with numerous knobs, channels and perforations find utility in electrical circuitry as capacitors, mounting plates for semi-conductors, housings for vacuum-tight seals and the like. Their utility is based upon their cheapness, their extreme durability, the ease with which they may be made, and their wide adaptability. The usual method of making ceramic bodies is by powder pressing, in which the powder is compressed to the approximate size of the ceramic body desired, and then the ceramic body so prepared is fired. After the ceramic body has been fired, it is said to be vitrified. To the vitrified ceramic body, a metal coating is applied to such areas as may be required, and the ceramic bodies with the coating are then cured by the application of heat in order to bond the metal coat and the ceramic together. The metal coat so achieved is of highly variable and uncertain characteristics because the uniform adherence of a metal coat to a smooth dense ceramic body is not easy to achieve. Failure of the metal to bond in a stable manner is wasteful. The present method involves not only the securing of a firmly bonded metal coat on the ceramic, but further involves the rapid production of metalized green ceramic bodies of great precision in size and shape and of innumerable complex forms, with innumerable complexly shaped and positioned coatings thereon. Such metalized green ceramic bodies may be rapidly punched from strips by the practice of the present invention. They are subsequently fired to vitrify the ceramic and to form an intimately bonded metal coat.

The first step is to prepare the basic material for the ceramic body. The usual ceramic material may be used. Aluminum oxide is satisfactory although there are many other well known materials. It is mixed with a fluid vehicle, a binder and a plasticizing agent. It is then cast into sheets or strips. To hasten the congealing, the temperature of the ceramic may be raised to approximately 160° F. depending upon the composition of the ceramic material, plasticizer or binder and vehicle. The ceramic material may also be cast in trays. There are numerous other methods of forming green ceramic bodies which are plastic.

A green ceramic strip however obtained should be relatively flexible, not crumbly, and it can be exceedingly thin. Ceramic bodies of highly complex and variable shapes, with numerous perforations, indentations, bevels and channels may be cut from a flexible ceramic body or strip by running it through a punch press. Before running the green ceramic body or strip through the punch press, a metal coat is applied to select portions of the body or strip in accordance with the areas of the ceramic which are required to be metalized. The metallic coat can be applied in any number of ways; by dipping, by brushing, by spraying, by pouring, by rolling it on, or by silk screening, etc. It has been found that when plasticized metalized green ceramic bodies are punched from the body or strip, the punching operation produces an extremely sharp and precise cut, not only of the plasticized green ceramic strip, but also of the metal coat which has been applied but which is not yet bonded to the ceramic. None of the metal coat is moved down over the raw cut edge of the ceramic, so that the dividing line between the metal coat and the green ceramimc is extremely sharp and unaltered by the punching operation. The continuous automatic operation of a punch press through which a plasticized ceramic body or strip is fed reduces the handling of the ceramic parts, avoids crumbling, and produces an extremely cheap, mass-produced, green ceramic to which a metal coat has been applied. The green ceramic is unfired and is still flexible and not subject to crumbling. If highly restricted areas of the green plastic body are to be metalized, they may also be metalized after the green ceramic strip has been cut or punched into the desired ceramic body shape.

After a metal coat has been applied, the firing of the plasticized metal coated ceramic body can be performed in the usual furnace in a reducing gas atmosphere. The plasticizing agent, the binder, and the vehicle, if any remains in the green ceramic are decomposed without leaving any substantial residue, and the green ceramic is fired to a dense, inflexible, non-porous ceramic body which has fused with the metal coat forming a metal-to-ceramic bond of great tenacity.

An example of a composition for preparing green ceramic bodies is as follows: aluminum oxide 96% by weight, talc 2% by weight, clay 2% by weight.

These ingredients are thoroughly mixed. A vehicle, benzol, is added in sufficient amount to form a thick, slurry. For 100 pounds of solid ingredients, about 30 pounds of vehicle should be sufficient to produce the proper thick, creamy consistency. To the mixture, approximately 5 pounds of polystyrene is added as a binder, and .5 pound of diphenyl phthalate is added as a plasticizing agent. The mixture may be poured into trays of proper depth to form sheets of desired thickness, which sheets can in turn be cut into strips. To hasten congealing, the trays may be moved through a heated zone having a temperature of 160° F. to cure the ceramic to a relatively dry, though flexible, state.

There are numerous metal powder coating compositions well known in the metalizing industry, such as tungsten powder, and molybdenum powder in varying proportions, molybdenum powder and manganese powder, preferably 95:5 by weight.

An example of one metalizing composition to be applied to a ceramic body is molybdenum powder of 325 mesh or finer. A quantity of powder is mixed in amyl acetate as a vehicle to form a syrupy material. To the syrupy material, one part of methyl cellulose by weight is added as a binder for the powder as the coat dries. After the plasticized ceramic strip has been formed and metalized with the above coating composition and metalized ceramic bodies have been punched from the strip, they may be placed on a conveyor belt or in a boat or on a metal sheet, or moved in any suitable manner through a hydrogen furnace where a maximum temperature of approximately 3100° F. is reached. The exact temperature is dependent on the ceramic material used. The atmosphere of the furnace should be a reducing gas such as hydrogen, carbon monoxide, ammonia or other reducing gases or an inert gas in order to avoid oxidation of the metal coat. External heat applied to the furnace by gas or electricity raises the temperature of the ceramics in the furnace progressively in zones as they move through the furnace. The maximum temperature reached is in the central zone of the furnace through which the ceramic body may pass in approximately one hour. Approaching the central zone, the temperature of the ceramic body and its metal coat is progressively raised for approximately 1 hour before reaching the hot zone. After leaving the hot zone, the cooling-off phase of the ceramic body continues with gradually lowering temperatures for approximately 1 hour. The firing time set forth is applicable to bodies approximately ⅛ inch in thickness. Thicker bodies may require a longer firing time. Very thin parts may be fired for an even shorter period. The green ceramic is decomposed and forms a hard, dense, vitrified body which fuses with the metal coat. The binder, the plasticizer and the solvent for the ceramic body are decomposed leaving no significant residue in the ceramic body. The vehicle for the metal powder and the binder are also decomposed, leaving no significant residue in the metal coat. As the ceramic body has vitrified in the high heat, it turns from a porous structure into a dense, impenetrable, hard structure and in so doing fuses with the metal coat. In the process of forming the non-porous dense ceramic body (which is said to be vitrified), the green ceramic is much more penetrable by the metal coat since it retains some of its relatively porous character. Possibly by reason of the migration of the metal into the only partly fired ceramic, or partly because of a molecular interlace of metal molecules with the ceramic molecules, an exceedingly intimate bond of metal to the ultimately, completely vitrified ceramic body is formed. The bond of ceramic to metal is found to be of highly predictable uniformity and intimate attachment over the entire area of contact where the ceramic body is fused with the metal coat. The metal coat is not oxidized by reason of the hydrogen reducing atmosphere of the furnace. The maximum temperature of the ceramic in the furnace must be sufficient to vitrify the ceramic and fuse it to the metal coat.

By the foregoing method, the individual treatment of ceramic bodies is avoided and labor costs are drastically reduced, so that the metalizing process may proceed largely on an automated basis. The substantial economy as previously referred to is achieved and the metalized ceramic body may be of great complexity as to form or shape, yet it is stable and durable and the bond of the metal to the ceramic is of highly intimate character.

Definitions

Reference has been had to fusing to characterize the bonding of the ceramic with the metal. It is understood the fusing is intended to include any bonding which is due to fusing, sintering, eutectic properties, melting of either or both the metal and the ceramic.

Reference has also been had to punching green ceramic bodies from a large green ceramic sheet or strip. It is to be understood that punching is intended to include cutting of discrete green ceramic bodies from a larger plastic green ceramic sheet regardless of whether such cuttings is by a punch, a blade, a combination of blades, planes, slicers, saws or any other cutting implement.

The foregoing steps are intended to be generally illustrative of a method of making metalized ceramic bodies, but as illustrations, they may be varied as to the composition of the plasticized ceramic, method of applying the metal coat, the composition of the metal coat, the firing time, the method of punching, shaping or forming green ceramic bodies; each of these elements or steps may be varied or have substitutes which may be known substitutes, such variant steps or substitutes are contemplated as being within the scope of the present invention.

What is claimed:

1. A method of simultaneously strongly and reliably fusing a metal coat to a ceramic body and vitrifying said body to form a metalized ceramic body suitable for a vacuum-tight seal housing in electrical circuitry comprising; (a) forming a green ceramic member consisting of aluminum oxide, a small amount of clay, a small amount of talc, and at least one of the class of fluid vehicles, binders, and plasticizing agents; (b) applying a coat of powdered metal selected from the group consisting of tungsten, molybdenum and manganese mixed with at least one of the class of vehicles and binders; (c) firing said green ceramic member and said applied metal coat in a reducing gas atmosphere at a temperature progressively raised to a maximum of approximately 3100° F. until said ceramic body and metal coat are bonded together, all said binders, vehicles and plasticizing agents are decomposed and the green ceramic body is vitrified into an inflexible fired ceramic body; and (d) progressively cooling said fired ceramic body and said metal coat.

2. A method as set forth in claim 1 wherein after step b but before step c a sharp, precise cut is made through both said metal coat and said ceramic body.

References Cited in the file of this patent
UNITED STATES PATENTS

| | | |
|---|---|---|
| 2,270,872 | Goede et al. | Jan. 27, 1942 |
| 2,449,952 | Pridham | Sept. 21, 1948 |
| 2,486,410 | Howatt | Nov. 1, 1949 |
| 2,641,675 | Hannahs | June 9, 1952 |
| 2,714,239 | Minnium | Aug. 2, 1955 |
| 2,795,033 | Cronin | June 11, 1957 |
| 2,893,112 | Moore et al. | July 7, 1959 |
| 2,919,483 | Gravley | Jan. 5, 1960 |
| 2,928,755 | Brandstadt | Mar. 15, 1960 |
| 3,004,197 | Rodriguez et al. | Oct. 10, 1961 |